(12) United States Patent
Marschall et al.

(10) Patent No.: US 7,871,028 B2
(45) Date of Patent: Jan. 18, 2011

(54) CHOPPER UNIT FOR BALED VEGETABLE MATERIAL SUCH AS STRAW

(76) Inventors: Roy Marschall, 2088 Marschall Rd., Shakopee, MN (US) 55379; Harlan Poppler, 5956 Gowan Ave. SW., Waverly, MN (US) 55390

( * ) Notice: Subject to any disclaimer, the term of this patent is extended or adjusted under 35 U.S.C. 154(b) by 0 days.

(21) Appl. No.: 12/363,237

(22) Filed: Jan. 30, 2009

(65) Prior Publication Data
US 2010/0193617 A1 Aug. 5, 2010

(51) Int. Cl.
- A01D 34/00 (2006.01)
- B02B 5/02 (2006.01)
- B02C 9/04 (2006.01)
- B03B 7/00 (2006.01)

(52) U.S. Cl. .......................... 241/101.761; 241/101.78; 241/605

(58) Field of Classification Search ............ 241/101.71, 241/605, 60, 101.78, 101.761, 186.2, 186.4
See application file for complete search history.

(56) References Cited

U.S. PATENT DOCUMENTS

| | | | | |
|---|---|---|---|---|
| 4,142,686 A | | 3/1979 | Houle | |
| 4,411,573 A | * | 10/1983 | Townsend | 414/24.6 |
| 4,412,659 A | * | 11/1983 | Crawford et al. | 241/35 |
| 4,428,537 A | * | 1/1984 | von der Heide | 241/101.742 |
| 4,448,361 A | | 5/1984 | Marcy | |
| 4,524,916 A | * | 6/1985 | Keyes et al. | 241/101.76 |
| 4,790,489 A | | 12/1988 | Paul | |
| 4,830,292 A | * | 5/1989 | Frey | 241/101.76 |
| 4,844,353 A | * | 7/1989 | Houle | 241/294 |
| 4,846,411 A | * | 7/1989 | Herron et al. | 241/101.761 |
| 5,033,683 A | * | 7/1991 | Taylor | 241/101.2 |
| 5,064,126 A | * | 11/1991 | Hickey et al. | 241/73 |
| 5,272,861 A | | 12/1993 | Roynberg | |
| 5,573,190 A | * | 11/1996 | Goossen | 241/27 |
| 5,813,616 A | | 9/1998 | Vandervalk | |
| 5,871,162 A | * | 2/1999 | Rajewski | 241/100 |
| 6,199,781 B1 | * | 3/2001 | Hruska | 241/101.763 |
| 6,572,039 B1 | | 6/2003 | Kruer et al. | |
| 6,827,304 B2 | * | 12/2004 | Rousseau | 241/73 |

* cited by examiner

*Primary Examiner*—Bena Miller
(74) *Attorney, Agent, or Firm*—Nawrocki, Rooney & Sivertson, P.A.

(57) ABSTRACT

A chopper unit for chopping bales of vegetation is particularly well suited for chopping large square bales. The chopper unit mounts on the arms of a transporter unit such as a skid loader. The unit includes a housing having a deck with a window therein. During normal operation, the deck faces upwardly. The housing includes a chopping chamber having the window in the deck at one end thereof, and extending to an opening or window in a side wall of the housing. A bale hopper mounted on the deck can translate along a predetermined path. The bale hopper extends generally upwardly when the unit is in an operating position, and surrounds the window in the deck. A vegetation cutter mounted within the chopping chamber partially projects through the deck's window and into the hopper. Rotating the cutter chops the vegetation into small pieces. The hopper translation allows the cutter to access the entire bottom surface of the bale. A fan preferably forces air into the chopping chamber adjacent to the cutter to sweep chopped bale particles to an opening in a wall of the housing.

20 Claims, 2 Drawing Sheets

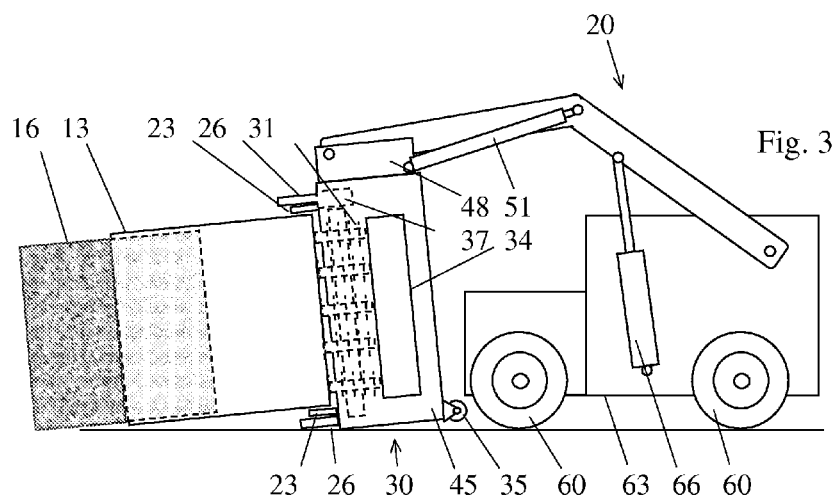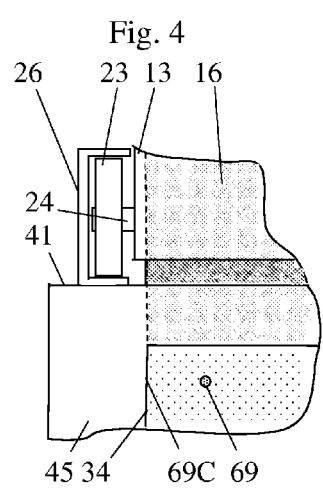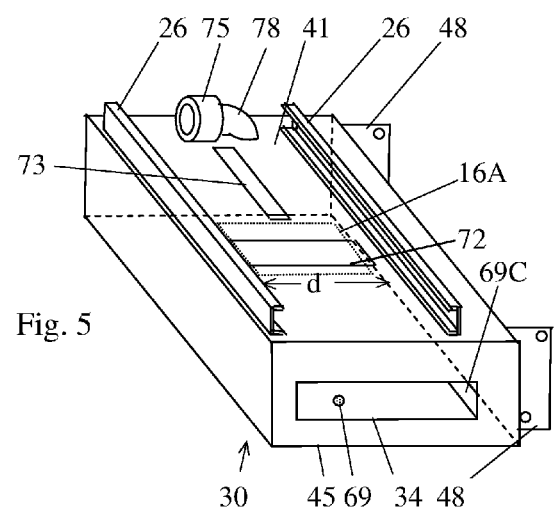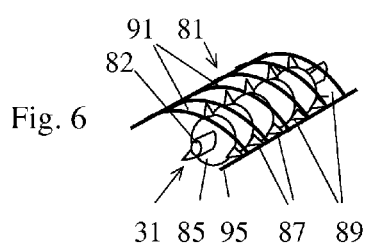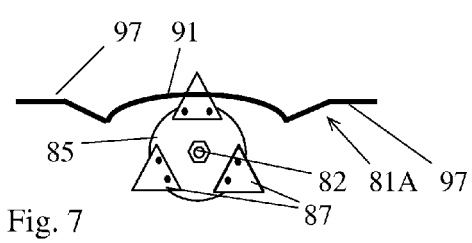

CHOPPER UNIT FOR BALED VEGETABLE MATERIAL SUCH AS STRAW

BACKGROUND OF THE INVENTION

Farmers and ranchers prefer to bale straw and hay before storage because baling compresses the material into a smaller, cohesive volume. A small and cohesive form makes handling and storage much easier.

Older balers formed bales that were perhaps 15 in. (40 cm.) by 15 in. (40 cm.) by 30 in. (80 cm.) and weighed typically from 35-75 lb. (16-35 kg.). Straw bales are less dense than hay bales, having density in the range of 6-10 lb./ft.$^3$. Hay bales may have density in the range of 8-15 lb./ft.$^3$. To some extent, the density is a function of the baler operation.

Newer types of balers form the loose straw or hay into larger bales having the shape of either large cylinders or rectangular prisms. One newer type of baler produces a rectangular bale that is 8 ft. (2.4 m.) long with a 3 ft. (0.9 m.) by 3 ft. (0.9 m.) cross section. Such a bale made from straw will weigh several hundred pounds (200-300 kg.), thus requiring power equipment for handling.

For purposes such as livestock bedding, straw must be loose to function efficiently. For this reason, farmers and ranchers convert baled straw back into a loose form before use, so that it absorbs animal waste efficiently. Loose straw also has landscaping applications such as for limiting erosion and for mulching roots.

These large bales prove difficult to convert into a loose form for spreading. When such bales were first available, farmers and ranchers moved them around with a tractor-mounted front end loader and then manually spread them with a fork. Farmers and ranchers found this to be difficult and time-consuming work.

Straw spreaders that mechanize this job are now available for smaller types of square bales and for larger round bales. However, the existing equipment designs for loosening and spreading larger rectangular straw bales are not widely accepted.

For large round bales, U.S. Pat. Nos. 4,142,686; and 4,448,361 each show a trailer for towing by a tractor, with the trailer carrying a unit for chopping and blowing the straw forming the bales. U.S. Pat. No. 4,790,489 shows a bale shredder that mounts on the rear of a tractor. Each of these patents shows a bale hopper or tub that rotates to continually present different parts of the bale's bottom surface to a chopping element.

Being carried by a trailer or rear-mounted on a tractor, these units are more difficult to maneuver in tight quarters such as a livestock barn. In particular, loading a square bale into a round hopper is difficult.

In view of these problems, currently available devices for processing large square straw bales for use as livestock bedding have deficiencies.

BRIEF DESCRIPTION OF THE INVENTION

A chopper unit for chopping bales of vegetation is particularly well suited for chopping large square bales. The chopper unit mounts on the arms of a transporter unit such as a skid loader. The unit includes a housing having a deck and a side wall, each with a window therein. When the unit is in an operating position, the deck faces generally upwardly.

The housing includes a chopping chamber generally in the form of a duct, and having the window in the deck at one end thereof, and extending to the window in the side wall of the housing.

A vegetation cutter mounted within the chopping chamber partially projects through the deck's window. Rotating the cutter chops the vegetation into small pieces.

A bale hopper in the form of a hollow box open on each end holds a bale for chopping. The hopper mounts on the deck for shifting or translation along a predetermined path. The bale hopper extends generally upwardly when the unit is in the operating position, with a bottom open end at least partially surrounding the window in the deck. The translation of the hopper along the deck allows the cutter to access the entire bottom surface of the bale. While shifting along the predetermined path, the deck window is always at least partially within the bottom edges of the hopper.

In one preferred embodiment, a hydraulic actuator shifts the hopper along the predetermined path on the deck. The hydraulic actuator preferably is within the housing.

Preferably, the unit also includes a fan providing a stream of high velocity air to the chopping chamber adjacent to the cutter. The high velocity air sweeps chopped bale particles from adjacent to the cutter through the window in the side wall of the housing.

The unit includes brackets in the form of plates for attaching the unit to the transporter unit arms so that the transporter unit can rotate the chopper unit from an operating position with the hopper extending generally upwardly, to a loading position with the end of the hopper opposite the deck near to the ground or floor. In the operating position, gravity should force a bale in the hopper to continually slide downwards as the cutter removes bottom portions of the bale.

BRIEF DESCRIPTION OF THE DRAWINGS

FIG. 3 is a side elevation view of the unit incorporating the invention with the unit rotated to allow loading of a bale.

FIG. 4 is a detail of a hopper support structure.

FIG. 5 is a perspective view of a housing for the unit that omits the hopper and hopper support mechanism.

FIG. 6 is a perspective isolation view of a cutter, and of a grid that supports the bale in spaced apart relation to the cutter.

FIG. 7 is an end elevation view of a preferred design for the cutter and grid.

DESCRIPTION OF THE PREFERRED EMBODIMENTS

Figure 1:
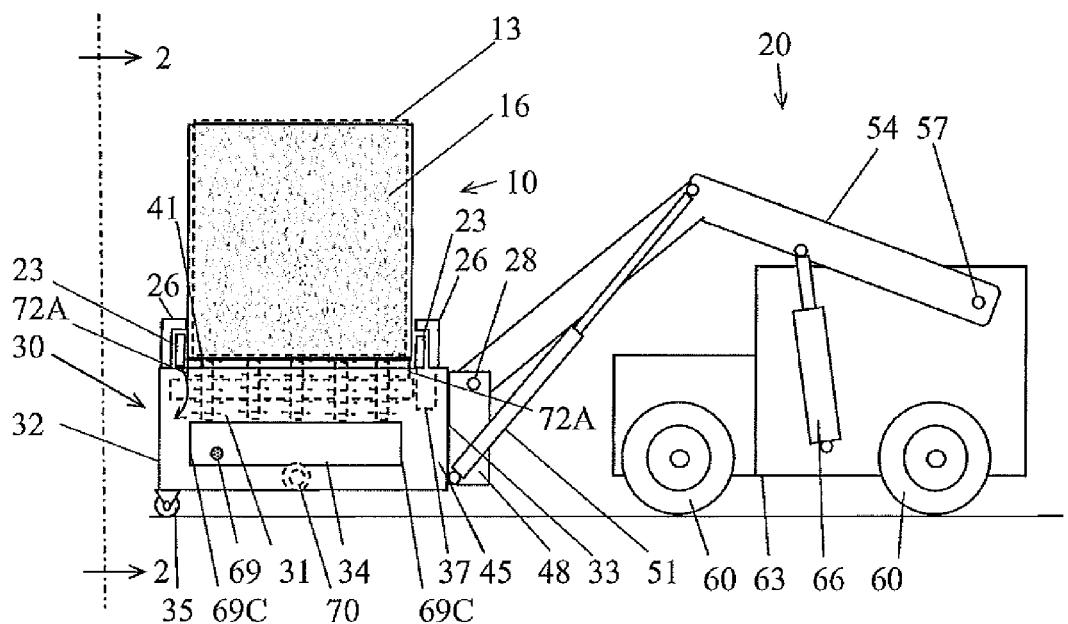
FIG. 1 is a side elevation view of a bale chopper unit incorporating the invention and supported in a position for use.
Figure 2:
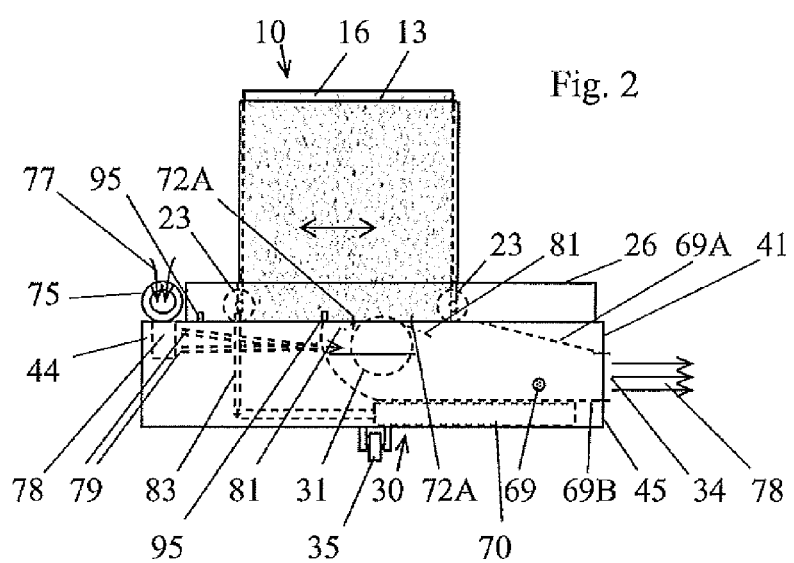
FIG. 2 is a front elevation view of the unit of FIG. 1.

FIGS. 1-3 show various elevation views of a transporter unit such as a conventional skid loader 20 suitable for carrying and deploying a bale chopper unit 10. Loader 20 has a chassis 63 with an operator station (not shown) with controls for loader 20.

Loader 20 carries bale chopper unit 10 on a pair of lift arms 54. Arms 54 serve as part of an implement lifting and tilting mechanism of loader 20. (Only one arm 54 is visible in the FIG. 1 side elevation view; the same is true for other components typically occurring in pairs in these types of units.)

Four wheels 60 allow loader 20 to move under an operator's control. Typically, the operator controls the relative speeds of the left and right pairs of wheels 60 to steer loader 20.

This description refers to "longitudinal" and "transverse" orientations of various components of the invention. "Longitudinal" means in alignment with a horizontal line parallel to the centerline or fore and aft axis of loader 20. "Transverse" means in alignment with a horizontal line perpendicular to a longitudinal line. A transverse orientation is perpendicular to the plane of the paper in FIGS. 1 and 3.

Loader 20 typically operates with a diesel engine although units with gasoline engines exist as well. Usually a loader 20 includes an engine-driven hydraulic pump providing a flow of pressurized hydraulic fluid to operate the various power components of unit 10 and loader 20. The operator controls flow of this hydraulic fluid to the power components with valves adjustable at the operator station. Design considerations for hydraulic motors and controls are well known, so no particular discussion of these hydraulic devices is necessary. Hydraulic cylinders for use as actuators can provide force in the tens of tons and are cheap and easy to implement, as are hydraulic motors with horsepower ratings in the 5-25 hp. range.

A pair of bearing pins or shafts 57 fastens arms 54 to the rear of chassis 63, allowing arms 54 to rotate or pivot with respect to loader chassis 63. (In the Figs., a small circle as at 57 or 28 designates a connection such as a shaft or bearing allowing rotation between the two elements connected at the circle.)

A pair of hydraulic cylinders 66 attached between arms 54 and chassis 63 operate under the operator's control to rotate arms 54 with respect to chassis 63 through a predetermined range of angles, perhaps 30° to 60°. Cylinders 66 generate sufficient force to allow arms 54 to lift perhaps 1000-2000 lb. (500-1000 kg.) at the free ends of arms 54.

The weight of loader 20 is sufficient and properly distributed to lift such loads with arms 54 while the two rear wheels 60 remain on the ground. Of course, wheels 60 have sufficient load-bearing capacity to support the entire weight of loader 20, unit 10, an operator, and a bale 16 carried by unit 10.

Unit 10 includes a housing 30 having an upper wall or deck 41 carrying various elements of unit 10. FIG. 5 shows housing 30 detached from most of the components of unit 10. Housing 30 has a front wall 32 and a rear wall 33. Connector plates or brackets 48 form the means by which housing 30 attaches to loader 20.

Deck 41 has a window 72 with a longitudinal dimension d slightly larger than the bale 16 cross section width. The view of FIG. 5 superimposes the outline 16A of the bottom end of a bale 16 on window 72. For one embodiment of window 72, d may equal about 40 in. (100 cm.) and the transverse dimension of window 72 may be around 15 in. (40 cm.).

Deck 41 carries a bale hopper 13 in the form of a hollow rectangular box open at top and bottom ends as shown in FIG. 1. Hopper 13 can move transversely on deck 41 along a predetermined path but is in continual alignment with window 72. "Alignment" in this context means that window 72 is always at least partially within the bottom end of hopper 13 regardless of the position of hopper 13 on the predetermined path. A part of the end of a bale 16 within bale hopper 13 as shown in FIGS. 1 and 2 is thus always above window 72 regardless of the hopper 13 transverse position.

The substantial weight of a unit 10 and bale 13 may sometimes strain the ability of a typical loader 20 to maneuver unit 10. One solution for this problem is a support wheel 35 projecting downwardly from the floor of unit 10 near front wall 32. The figures show wheel 35 with a fixed transverse axis, but a caster (vertical swivel axis) suspension for wheel 35 may be desirable for some designs.

Top and bottom walls 69A and 69B within housing 20 define the top and bottom of a chopping chamber 69. Chopping chamber 69 has side walls spaced from the front and back walls of housing 30. Chamber 69 has an exit opening or window 34 on the left sidewall 45. A rotating cutter 31 within chopping chamber 69 chops bales 16. The diameter of cutter 31 may range from 10-15 in. (25-40 cm.), and the length may run from 3-3.5 ft. (75-85 cm.), sufficient to extend across the entire width of a large square bale.

A cutter 31 of reasonable size will at any time engage only a fraction of the entire bottom surface of a typical large bale 16, so hopper 13 must translate to present the entire bottom surface of bale 16 to cutter 31. In one embodiment, hopper 13 has a support comprising four wheels 23 that allow hopper 13 to smoothly move or translate transversely as the double arrow of FIG. 2 indicates. This translation feature allows a cutter 31 to progressively engage the entire bottom surface of the bale 16.

Retainer rails 26 comprise a guide that positively holds wheels 23 near the outer surface of deck 41 to retain hopper 13 adjacent to deck 41 regardless of the angular position of unit 10. Rails 26 determine the predetermined path along which hopper 13 moves.

FIG. 4 shows more details of this relationship in a side elevation view depicting the relationship of the rail 26, deck 41, and wheel 23. Retainer rails 26 comprise shallow U-channel beams with one flange bolted or welded to deck 41 so that the U-channel web is perpendicular to deck 41. Each wheel 23 rotates on an axle 24. The wheels 23 engage the interior of a U-channel form of rail 26, retaining each wheel 23 within the rails 26 and holding hopper 13 close to and with a substantially constant spacing from the deck 41 whether unit 10 is in the operating position of FIG. 1 or the loading position of FIG. 3.

In this embodiment, the rails 26 and wheels 23 comprise a guide mounted on upper wall 41 for controlling movement of hopper 13 along a predetermined linear path. Other structures can provide similar functionality for allowing and guiding translation of hopper 13.

The ends of arms 54 opposite pins 57 connect with pins 28 to connector plates 48 forming part of housing 30. Pins 28 allow unit 10 to pivot with respect to arms 54. Plates 48 comprise a fitting on the external surface of housing 30 for connecting unit 10 to the skid loader arms 54.

Control hydraulic cylinders 51 connect between plates 48 and arms 54 to allow the operator to set the angle of unit 10 with respect to arms 54. Cylinders 51 have rotating connections to each of arms 54 and plates 48 to accommodate changing angles between cylinders 51, arms 54, and plates. Cylinders 51 along with arms 54 and cylinders 66 form part of a tilting mechanism on loader 20 that controls the angular orientation of chopper unit 10 with respect to arms 54. Of course, a variety of mechanisms may provide the tilting or angular orientation function for loader 20.

The extension ranges of cylinders 66 and 51 preferably allow unit 10 to rotate from the upright, operating position shown in FIG. 1 to a loading position shown in FIG. 3. FIG. 3 shows unit 10 rotated counterclockwise by at least approximately 90° relative to the position shown in FIG. 1 with respect to the horizontal. In FIG. 3, the top (as shown in FIG. 1) of hopper 13 is near the ground. In the position of FIG. 3, loading at least a part of a bale 16 into a bale hopper 13 is much easier than if unit 10 is upright as shown in FIG. 1. The interaction of wheels 23 with rails 26 prevent hopper 13 and deck 41 from separating when unit 10 is in the loading position.

Hopper 13 extends upwardly when unit 10 is in the operating position of FIG. 1 so that gravity causes bale 16 to constantly press on window 72. Preferably, the axis of hopper 13 is substantially vertical when unit 10 is in the operating position, but may slant from the vertical so long as bale 16 will consistently slide downwardly as chopping of its lower end occurs.

Hash marks 72A in FIGS. 1-3 indicate the edges of window 72 in deck 41. The size of window 72 allows a portion of a cutter 31 to project above deck 41. The fore and aft width of window 72 (along the centerline of loader 20) is preferably similar to and slightly smaller than the corresponding interior dimension of hopper 13.

FIGS. 1 and 2 show cutter 31, in phantom (dotted line) outline mounted for rotation in chamber 69 with an axis of rotation that is longitudinally oriented within housing 30. Cutter 31 partially projects through window 72 and into hopper 13 by an inch or two (2.5-5 cm.). Rotating cutter 31 chops the portion of a bale 16 contacting cutter 31 into small pieces.

Cutter 31 includes a shaft 82 carrying a number of disks 85 each having a set of projecting teeth or blades 87 around their peripheries that are suitable for chopping bales 16 of vegetation such as straw. The view of cutter 31 in FIG. 6 omits most of the disks 85 for sake of clarity. A preferred embodiment may have around 25-30 or so disks 85 that are closely packed. A drive motor 37 spins cutter 31 at an appropriate speed for chopping the material comprising bales 16, perhaps 1000-3000 rpm. with the upper end of the range more often preferred. Motor 37 may operate on hydraulic fluid flow.

FIG. 2 shows in phantom, an end view of a grid or screen 81 attached to housing 30 and covering window 72 to support a bale 16 at an appropriate spacing from cutter 31. FIGS. 6 and 7 show details of cutter 31 and grid 81. The detail of FIG. 6 shows grid 81 and cutter 31 in a perspective view. Blades 87 project perhaps an inch through longitudinally oriented slots 89 in grid 81.

In one embodiment, cutter 31 is approximately 39 in. (100 cm.) long with individual disks that are 1.4 in. (3.5 cm.) thick. Each disk 85 may be in the range of 5-6 in. (12.5-15 cm.) in diameter. Each disk 85 carries a set of three cutting teeth 87 angularly spaced at 120° around the periphery thereof as FIG. 7 shows. Preferably, teeth 87 comprise special serrated triangular sections attached with pins to disks 85 as FIG. 7 shows. Cutter 31 is available as a commercial unit. The spacing of adjacent sets of teeth 87 may be from 1-2 in. (2.5-5 cm.). A commercial version of cutter 31 has 28 sets of teeth 87 spaced at 1.4 in. (3.5 cm.).

Grid 81 comprises a frame 95 and a number of spaced bars 91 that define the slots 89 between them. The spacing of bars 91 places them between the teeth 87 on each pair of adjacent disks 95. The mounting of grid 81 and cutter 31 allows individual teeth 87 to project through grid 81 by approximately 0.5-1 in. (1.25-2.5 cm.). The width of individual slots 89 between bars 91 may vary from 0.375-1 in. (1.0-2.5 cm.) with 0.5-0.75 in. (1.25-2 cm.) preferable. Wider slots 89 result in greater coarseness of the chopped vegetation.

FIG. 7 shows an axial elevation view of a cutter 31 and a cross section view of a preferred grid 81A having a wing-like shape. In use, individual wing portions or elements 97 of grid 81A assist in supporting an individual bale 16 in a position relative to the cutter 31 that allows teeth 87 to properly engage the bottom of bale 16. The horizontal dimension of grid 81 as shown in FIG. 7 may be slightly greater than the transverse dimension of window 72 Other shapes of grid 81 are also possible that provide support for bale 16.

A source of compressed air such as a hydraulically operated fan 75 mounted on deck 41 near sidewall 44 provides a powerful stream of air that flows transversely through chamber 69 and exits through window 34. Arrows at 77 indicate air that enters fan 75. Fan 75 forces air into a plenum 78 within housing 30. Ducts 79 within housing 30 conduct the air flow from plenum 78 to chopping chamber 69 near cutter 31. Ducts 79 connect to chamber 69 along the longitudinal (axial) length of cutter 31. The orientation of ducts 79 preferably directs their exiting air stream generally toward window 34 as the arrow in FIG. 2 between chopper 34 cutter 31 and the ends of ducts 79 shows. Preferably, the speed of fan 75 is adjustable by the operator using controls at the operator station, and may produce an air stream whose velocity ranges from approximately 50-200 ft./sec. (15-60 m./sec.) at the window 34.

The air stream through chamber 69 entrains particles of straw or other vegetation formed by rotation of cutter 31 against bale 16. The particle-laden air exits chamber 69 through window 34 in sidewall 45, symbolized by the arrows 78. Experience shows that the particles are large enough to fall from the air stream relatively quickly as the air stream loses speed at a point from window 34, without forming a potentially hazardous aerosol of dust. Adjusting air speed changes the point at which particles drop from the air stream.

The weight of bale 16 effectively seals window 72 so that only a little air from fan 75 and chopped bale particles escape from chopping chamber 69 through window 72. Even when little of the bale 16 remains in hopper 13, the bottom surface of the remaining bale 16 prevents most of the chopped particles from escaping chamber 69 through window 72.

Given that a bale or portion of a bale 16 prior to loading into hopper 13 may weigh 100-250 kg, inserting the bale 16 is easiest when unit 10 is rotated approximately 90° and lowered to the ground as shown in FIG. 3. In this position, pushing or pulling bale 16 into hopper 13 is relatively easy. The operator can rotate unit 10 using cylinders 51 and raise or lower unit 10 using cylinders 66 to place unit 10 on or close to the ground.

Because of the size and weight of a bale 16 and hopper 13, it is desirable to transversely position hopper 13 using a power assist. One way to provide such power-assisted hopper 13 positioning is with a double-acting hydraulic actuator 70 such as FIG. 2 shows. A bracket attaches actuator 70 within and on the floor of housing 30. A hopper bracket 83 that is rigidly attached to the center of the right side (adjacent to fan 75) of hopper 13 extends downwardly through a slot 73 (FIG. 5) in deck 41 and between chopping chamber 69 and the right wall of housing 30. Actuator 70 pushes and pulls on bracket 83 to position hopper 13.

The operator has controls at the operator station for controlling the transverse position of hopper 13. The operator will usually shift the transverse position of hopper 13 from one extreme to the other using the actuator 70 controls to periodically present all areas of the bale 16's bottom surface to cutter 31.

Alternatively, unit 10 may include position sensors 95 that sense either directly or indirectly, the approach of bracket 83. Sensors 95 then send signals to a controller, not shown, to change the direction of hopper 13 movement. Actuator 70 in this case automatically controls the speed at which hopper 13 moves during translation according to well known principles of hydraulic actuation. The design of actuator 70 preferably allows the operator to control the translation speed of hopper 13. Typical speeds may range from about 10-50 ft./min. (3-15 m./min.) depending on the density of the bale 16 and the coarseness desired for the chopped vegetation particles. The faster hopper 13 moves, the coarser are the particles.

In use, an operator rotates unit 10 into the loading position of FIG. 3 and pushes or pulls a bale 16 into hopper 13. The operator then lifts unit 10 slightly and rotates unit 10 so that the walls of hopper 13 are sufficiently upright to allow a bale 16 within hopper 13 to slide under the force of gravity against grid 81, as cutter 31 removes material from the bottom of bale 16. The operating position of FIG. 1 shows hopper 13 with a substantially vertical orientation, but an orientation as great as 30° from the vertical may still allow bale 16 to slide downwardly as cutter 31 removes portions of the bale 16 bottom.

The operator then applies power to cutter 31, fan 75, and actuator 70. Cutter 31 starts chopping material from the lower end of bale 16. As cutter removes portions of bale 16, gravity slides bale 16 downwards against cutter 31. Fan 75 forces chopped bale 16 parts through chopping chamber 69 and out window 34. By steering loader 20, the operator directs the airborne stream of chopped vegetation where desired.

What we claim is:

1. A chopper unit for chopping a rectangular bale of vegetation, said chopper unit for mounting on a movable lift arm of a transporter unit, comprising:
   a) a housing having an interior space, a deck with a deck window therein, and a sidewall intersecting the deck and with a sidewall window therein, said deck facing generally upwardly when the chopper unit is in an operating position,
   b) a bracket attached to the housing for connecting the chopper unit to the movable lift arm of the transporter unit, and allowing the movable arm to lift the chopper unit;
   c) a chopping chamber within the housing interior space and extending from the deck window to the sidewall window of the housing;
   d) a rectangular bale hopper for receiving a bale for chopping, said bale hopper mounted on the deck for translation along a predetermined substantially straight line path, said bale hopper extending generally upwardly when the unit is in the operating position, said predetermined path maintaining alignment of the hopper with the deck window; and
   e) a vegetation cutter mounted at least partially within the chopping chamber and partially projecting through the deck window and into the hopper, for chopping the vegetation forming the bale.

2. The chopper unit of claim 1, wherein the mounting of said bale hopper on the deck carries the bale hopper along a transverse path on the deck, and wherein the chopper unit further comprises an actuator attached to the bale hopper and the housing for shifting the bale hopper along the predetermined path.

3. The chopper unit of claim 2, including a hopper guide on the deck and in mechanical connection to the hopper, and extending along the predetermined path.

4. The chopper unit of claim 3, wherein the hopper guide comprises a U-channel beam attached to the deck, and including a hopper support comprising a plurality of wheels mounted on the hopper and engaging with the U-channel beam to retain the hopper in a substantially constant spacing from the deck.

5. The chopper unit of claim 4, including a sensor mounted on the deck and sensing the approach of the hopper.

6. The chopper unit of claim 2, wherein the actuator is within the interior space of the housing with the chopping chamber between the actuator and the deck.

7. The chopper unit of claim 6, wherein the deck includes a slot spaced from the chopping chamber; and wherein the hopper includes a rigidly attached bracket projecting toward the housing from the hopper and through the slot in the deck, said bracket attached to the actuator.

8. The chopper unit of claim 1, wherein the chopping chamber has an air intake adjacent to the cutter for receiving a stream of air, and wherein the chopper unit includes a fan mounted on the housing for forcing air into the air intake.

9. The chopper unit of claim 8, including a plenum receiving the stream of air from the fan, and a plurality of ducts conducting the air stream to the air intake.

10. The chopper unit of claim 1, wherein the vegetation cutter has a plurality of projecting teeth, and the chopper unit includes, interposed in the window in the deck, a grid for supporting the bale, said grid having a slot through which cutter teeth project.

11. The chopper unit of claim 10 wherein the grid has a wing-like structure viewed along the axis of rotation of the cutter.

12. The chopper unit of claim 10, wherein the spacing between the grid and the cutter provides for the cutter teeth to project a predetermined amount through the grid.

13. The chopper unit of claim 1, intended for use with a transporter unit having a tilting mechanism that cooperates with the lift arm, wherein said bracket attached to said housing connects the chopper unit to the transporter unit arm and to the tilting mechanism.

14. The chopper unit of claim 13, including
   a) a hopper support comprising a plurality of wheels mounted on the hopper; and
   b) a hopper guide comprising a U-channel beam mounted on and extending transversely along the deck, with which the wheels engage.

15. A chopper unit for chopping rectangular bales of vegetation, comprising:
   a) a housing having a deck with a deck window therein and a sidewall intersecting the deck and with a sidewall window therein, said deck facing generally upwardly when the unit is in an operating position,
   b) a chopping chamber having the deck window at one end thereof, and extending to the sidewall window in the sidewall of the housing;
   c) a bale hopper for receiving a bale for chopping, said bale hopper mounted on the deck for translation along a predetermined substantially straight line path, said bale hopper extending generally upwardly when the unit is in the operating position, said predetermined path maintaining alignment of the hopper with the deck's window; and
   d) a vegetation cutter mounted at least partially within the chopping chamber and partially projecting through the deck's window and into the hopper, for chopping the vegetation forming the bales.

16. The chopper unit of claim 15, wherein said bale hopper translates transversely on the deck, and wherein the chopper unit further comprises an actuator attached to the bale hopper and to the housing for shifting the bale hopper along the predetermined path.

17. The chopper unit of claim 16, including a hopper guide on the deck and in mechanical connection to the hopper, and extending along the predetermined path.

18. The chopper unit of claim 17, wherein the hopper guide comprises a U-channel beam attached to the deck, and including a hopper support comprising a plurality of wheels mounted on the hopper and engaging with the U-channel beam to retain the hopper in a substantially constant spacing from the deck.

19. The chopper unit of claim 17, wherein the hopper includes a plurality of rotating elements for supporting the hopper while the hopper shifts along the predetermined path, and wherein the hopper includes a retaining feature engaging with the hopper guide to retain the hopper adjacent to the deck regardless of the angular position of the chopper unit.

20. The chopper unit of claim 19, wherein the hopper guide includes a flange, and the hopper's rotating elements comprise wheels engaging with the flange to form the hopper's retaining feature.

* * * * *